Patented Oct. 13, 1953

UNITED STATES PATENT OFFICE 2,655,516

3-BETA-ACYLOXY-5,7,9(11)-PREGNATRIEN-12,20-DIONES

Robert H. Levin, A Vern McIntosh, Jr., and George B. Spero, Kalamazoo, Mich., assignors to The Upjohn Company, Kalamazoo, Mich., a corporation of Michigan No Drawing. Application May 24, 1951,
Serial No. 228,134

5 Claims. (Cl. 260—397.4)

The present invention relates to 3-beta-acyloxy-5,7,9(11)-pregnatrien-12,20-diones, and to processes for their production.

This application is a continuation-in-part of our copending application Serial No. 184,702, filed September 13, 1950, now Patent No. 2,623,043, to which reference is made also for the preparation of the starting compounds referred to in this specification.

The 3-beta-acyloxy-5,7,9(11)-pregnatrien-12,20-diones which are the preferred embodiment of this invention are represented by the following formula:

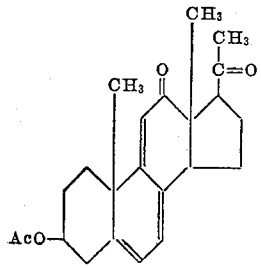

in which Ac is an acyl radical or the residue of an organic carboxylic acid, especially those aliphatic carboxylic acids containing from 1 to 8 carbon atoms, inclusive, per molecule.

The principal object of the present invention is to provide novel compounds which are useful in the preparation of steroid compounds containing an oxygen atom at carbon atom 11 in the steroid nucleus. Another object of the present invention is to provide a process for the production of these new compounds. Other objects and advantages of the invention, some of which are referred to hereinafter, will be apparent to those skilled in the art to which the invention pertains.

The compounds of the present invention are useful in the preparation of steroid compounds having an oxygen atom attached to carbon atom 11. Such oxygen-containing steroids are of particular interest because of the biological activity of the adrenal cortical hormones and certain known derivatives thereof, which differ markedly in their biological effects from steroids that lack oxygen in their constitution. Because of the present acute shortage of adrenal cortical hormones and the lack of methods for their synthesis, the compounds of the present invention offer promise as starting materials for the production of oxygen-containing steroids possessing desirable biological activity.

Compounds of the present invention which are of particular interest are those compounds conforming to the foregoing general formula and in which AcO represents the radical resulting from the esterification of the 3-hydroxyl group of the steroid with a carboxylic acid containing up to and including 8 carbon atoms. Such acids include formic, acetic, propionic, butyric, valeric, hexanoic, heptanoic, octanoic, succinic, glutaric, cyclopentanoic, cyclohexanoic, benzoic, toluic, and the like; the lower aliphatic acids of this group are preferred embodiments of the invention. The acids may contain other substituents, such as halogen, alkyl and methoxy radicals, which are nonreactive with the reagents used in the methods described herein for the preparation of the compounds of the invention.

The compounds of the present invention are usually colorless crystalline solids. The steroid nucleus of the compounds of the present invention may be partially or completely saturated by hydrogenation. The compounds are also convertible to 3-hydroxy and 3-keto derivatives.

The starting compounds from which the compounds of the present invention are prepared are adducts of 12-keto-3-beta-acyloxy-5,7,9(11)-pregnatrien-20-ones with maleic acid and anhydride, having the general formula:

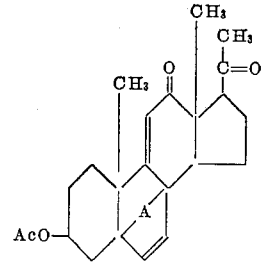

in which Ac has the significance hereinbefore specified and A is the adduct radical of an alpha,-beta-unsaturated dicarboxylic acid of the group consisting of maleic acid and maleic anhydride. The adduct bridge (—A—) that is represented between the 5 and 8 positions of the steroid nucleus of these compounds may be represented by the graphic formulae:

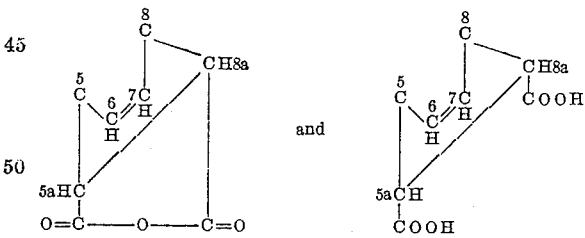

the first of which represents that derived from maleic anhydride while the second represents that derived from maleic acid.

The preparation of the compounds of this invention, which is described in detail in our copending applications Serial 184,702, filed September 13, 1950, and Serial No. 228,133 filed concurrently herewith, consists essentially of the following (alternative procedures are also described in our said copending applications):

1. Dehydroergosterol is converted to an adduct with maleic anhydride or maleic acid [H. Honigmann, Annalen 508, 89–98 (1934)].
2. The adduct of dehydroergosterol is esterified by reaction, for example, with benzoyl chloride, acetyl chloride or formic acid.
3. The resulting adduct of the 3-beta-acyloxy-dehydroergosterol is ozonized and then reduced in acid solution with zinc dust to obtain an adduct of a 3-beta-acyloxybisnor-5,7,9(11)-cholatrien-22-al. (See application of Robert H. Levin, Serial No. 111,100, filed August 18, 1949, now Patent No. 2,260,337, for details.)
4. An enol ester of the resulting 3-beta-acyloxybisnor-5,7,9(11)-cholatrien-22-al adduct is prepared and ozonized to the adduct of a 3-beta-acyloxy-5,7,9(11)-pregnatrien-20-one.
5. The resulting adduct of the 3-beta-acyloxy-5,7,9(11)-pregnatrien-20-one is reacted with N-bromosuccinimide or bromine to produce an adduct of a 3-beta-acyloxy-12-bromo-5,7,9(11)-pregnatrien-20-one.
6. The adduct of the 3-beta-acyloxy-12-bromo-5,7,9(11)-pregnatrien-20-one, on reaction with silver nitrate as described in our copending application Serial No. 228,131, filed May 24, 1951, yields the adduct of 3-beta-acyloxy-12-hydroxy-5,7,9(11)-pregnatrien-20-one. Other methods for the preparation of the 12-hydroxy compound are described in our copending application Serial No. 228,132 filed on even date herewith.
7. The adduct of the 3-beta-acyloxy-12-hydroxy-5,7,9(11)-pregnatrien-20-one is then oxidized with chromic acid, as described in our copending application Serial No. 228,133, to obtain the desired adduct of the 3-beta-acyloxy-5,7,9(11)-pregnatrien-12,20-dione.

In accordance with the process of our invention, maleic acid and maleic anhydride adducts of 3-acyloxy-5,7,9(11)-pregnatrien-12,20-diones of this invention are converted to trienes, namely 3-acyloxy-5,7,9(11)-pregnatrien-12,20-diones, having double bonds at the 5(6), 7(8) and 9(11) positions, and the formula:

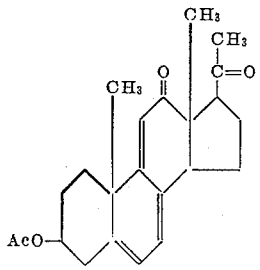

wherein Ac has the significance hereinbefore specified. The removal of the maleic acid or maleic anhydride radical is effected by a pyrolysis reaction which consists essentially in heating the maleic acid or maleic anhydride adduct of the 3-acyloxy-5,7,9(11)-pregnatrien-12,20-dione in the presence of an organic amine at a temperature of approximately 100 to approximately 225 degrees centigrade, with or without the presence of an organic solvent, and thereafter isolating the product triene. It is not necessary to isolate the adducts from reaction mixtures in which they are formed in order to effect the removal of the adduct radical in accordance with such pyrolysis processes, since the entire reaction mixture or crude product may be treated. The desired triene can be obtained in a high degree of purity and in excellent yields.

Amines which can be used in this pyrolysis process include: secondary aliphatic amines such as dimethylamine, diethylamine, dipropylamine, dibutylamine, diamylamine, dioctylamine; tertiary aliphatic amines such as trimethylamine, triamylamine, methyldioctylamine, methyldiethylamine; secondary and tertiary cycloaliphatic amines such as N-methylcyclohexylamine, N,N-dimethylcyclohexylamine, N,N-diethylcyclohexylamine; secondary and tertiary heterocyclic amines such as pyrrolidine, N-methylmorpholine, N-ethylpyrrolidine, morpholine, piperidine, N-methylpiperidine, 2-methylpiperidine, 1,2-dimethylpiperidine, 1,2,4-trimethylpiperidine, 2,4,6-trimethylpiperidine, 1-ethyl-2,4,6-trimethylpiperidine; aromatic heterocyclic amines such as pyridine, picoline, lutidine, collidine, quinoline, quinaldine, lepidine, 3-methylquinoline; secondary and tertiary carbocyclic aromatic amines such as N-methylaniline, N-ethylaniline, N-butylaniline, N-benzylaniline, N,N-dimethylaniline, N,N-diethylaniline, N,N-dibutylaniline, N,N-dibenzylaniline, N-methyltoluidine, N,N-diethyltoluidine, N-ethylxylidine, N,N-dimethylxylidine; substituted aliphatic amines such as diethylaminoethanol, dibutylaminoethanol, N-pyrrolidylethanol, N-piperidylethanol; substituted aromatic amines such as ortho-methoxy-N,N-dimethylaniline, para-ethoxy-N,N-diethylaniline, para-chloro-N,N-dimethylaniline, para-bromo-N,N-diethylaniline, para-fluoro-N,N-dibutylaniline, N,N-dimethylmesidine (N,N-dimethyl-2,4,6-trimethylaniline); secondary and tertiary aralkyl amines such as methylbenzylamine, dimethylbenzylamine, propylbenzylamine, diisopropylphenethylamine, diethylphenylisopropylamine; and primary amines such as butylamine, hexylamine, octylamine, cyclohexylamine, aniline, toluidine, xylidine and the like.

The process comprises heating the selected 3-acyloxy-12,20-dione maleic acid or maleic anhydride adduct to a temperature between approximately 100 and approximately 225 degrees centigrade, preferably between 175 and 200 degrees centigrade, in the presence of an organic amine, removing excess amine, and recovering the product triene. The time required for the reaction is usually from approximately 1 to approximately 8 hours, depending upon such factors as the particular steroid adduct being treated, the amine employed, and the temperature of reaction. Ordinarily, a reaction period of approximately 4 hours is entirely satisfactory, although, at lower temperatures, a more extended period may be employed to advantage. The employment of pressure may in some cases be advantageous, although it is in most cases preferred to conduct the pyrolysis reaction at atmospheric pressure. After completion of the reaction, the triene product can be recovered in conventional manner, such as by evaporation of solvent in vacuo, redissolving the residue in an organic solvent, e. g., methanol, diluting with water, extracting with ether, washing the solution until neutral, drying, evaporating to dryness, chromatographing over an alumina column, and recrystallizing from an organic solvent, if desired.

*Example.—3-beta-acetoxy-5,7,9(11)-pregnatrien-12,20-dione*

Three grams of the maleic anhydride adduct of 3 - beta - acetoxy - 5,7,9(11) - pregnatrien- 12,20-dione, melting point, 232–235 degrees centigrade, prepared as described in our copending application Serial No. 228,133, was mixed with 30 milliliters of N,N-dimethylbenzylamine and heated at reflux temperature for 6 hours, the compound going into solution as soon as heat was applied. The solvent was then removed at a subatmospheric pressure and the residue dissolved in 50 milliliters of methanol, diluted with 300 milliliters of water, and extracted with four 75-milliliter portions of ether. The ether solution was washed successively with 200 milliliters of cold 2-percent hydrochloric acid solution, 200 milliliters 1-percent sodium carbonate solution, and water. After drying the solution and evaporating it to dryness, 2.01 grams of residue was obtained. This residue was purified by chromatography over alumina, resulting in a yield of 0.62 gram of crystalline 3-beta-acetoxy-5,7,9(11)-pregnatrien-12,20-dione, melting point 150–158 degrees centigrade. Recrystallization from alcohol raised the melting point to 160–162 degrees centigrade. Analysis:

*Analysis:*
Calculated for $C_{23}H_{28}O_4$ _____ C, 74.97; H, 7.66
Found _____ 75.13; 7.31
74.79; 7.60

The 3 - acyloxy - 5,7,9(11) - pregnatrien-12,20-diones are convertible to 3-hydroxy-5,7,9-(11) - pregnatrien - 12,20 - dione having the formula:

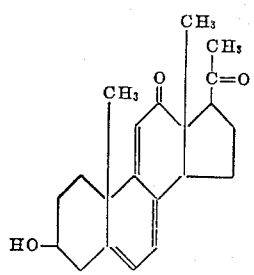

by saponification of the 3-acyloxy compound in an alcohol, e. g., methanol or dioxane, as well as similar solvents, using at least one equivalent of an aqueous solution of a base. The product is isolated by drowning out with water or in other conventional manner, and may be purified by recrystallization from an organic solvent, if desired. These compounds and methods for their production are described more fully and claimed in our copending application Serial No. 231,904, now Patent No. 2,628,240.

The 3 - hydroxy - 5,7,9(11) - pregnatrien-12,20-dione is in turn convertible to the triketone, 4,7,9(11)-pregnatrien-3,12,20-trione, having the formula:

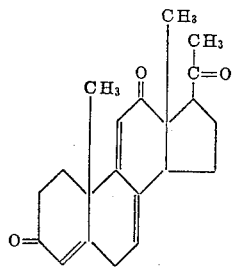

by dissolving the starting 3-hydroxy compound in a suitable organic solvent, e. g., toluene, adding cyclohexanone and aluminum isopropoxide, and refluxing the solution for from 3 to 8 hours. The reaction product may then be poured into a dilute aqueous solution of ammonium chloride, and the product triketone extracted with ether. The ether solution may then be washed successively with dilute hydrochloric acid and water, dried, and the solution evaporated to dryness. The residue may be crystallized from an organic solvent to give a more highly purified triketone product, if desired. This triketone, and a method for its production are described more fully and claimed in our copending application Serial No. 264,648, filed January 2, 1952.

The trienes of the present invention may be hydrogenated in steps to produce compounds in which the steroid nucleus is partially or completely saturated. Thus, when 3-beta-acetoxy-5,7,9(11)-pregnatriene-12,20-dione is hydrogenated at a superatmospheric pressure in the presence of a palladium catalyst (for example, 10 per cent palladium on calcium carbonate or 20 per cent palladium on charcoal), 3 - beta - acetoxy-8(9)-pregnene-12,20-dione:

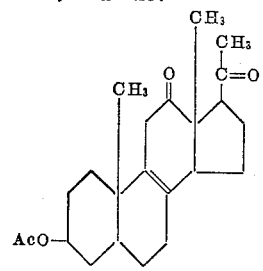

is the product when the reduction is stopped after absorption of 2 molecular proportions of hydrogen. If the hydrogenation is continued, 3-beta-acetoxy-pregnane-12,20-dione:

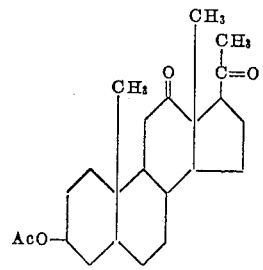

is formed.

Although the foregoing specification is directed particularly to the pyrolysis of the maleic anhydride adduct of 3-beta-acetoxy-5,7,9(11)-pregnatrien-12,20-dione to produce 3-beta-acetoxy-5,7,9(11)-pregnatrien-12,20-dione, it is to be understood that maleic acid adducts and both maleic acid and maleic anhydride adducts of other 3 - beta-acyloxy - 5,7,9(11) - pregnatriene-12,20-diones and may be similarly treated to remove the adduct radical. Accordingly, the invention is to be limited solely to the compounds and processes specified in the claims.

We claim:
1. A 3 - beta-acyloxy - 5,7,9(11) - pregnatrien-12,20-dione represented by the formula:

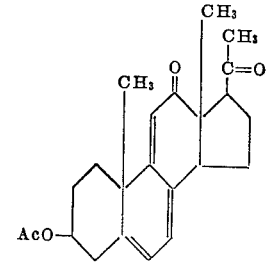

in which Ac is an alkyl carbonyl radical containing from 1 to 8 carbon atoms, inclusive.

2. 3-beta-acetoxy-5,7,9(11)-pregnatrien-12,20-dione.

3. A process for the production of a 3-beta-acyloxy-5,7,9(11)-pregnatrien-12,20-dione which comprises heating an adduct of the group consisting of maleic acid and maleic anhydride adducts of 3-beta-acyloxy-5,7,9(11)-pregnatrien-12,20-diones, wherein the acyloxy group contains up to and including eight carbon atoms, in the presence of an organic base, and subsequently recovering the 3-beta-acyloxy-5,7,9(11)-pregnatrien-12,20-dione.

4. A process as defined in claim 3 in which the temperature of heating is maintained between approximately 100 and approximately 225 degrees centigrade.

5. A process for the production of 3-beta-acetoxy-5,7,9(11)-pregnatrien-12,20-dione which comprises heating the maleic anhydride adduct of 3-beta-acetoxy-5,7,9(11)-pregnatrien-12,20-dione in the presence of N,N-dimethylbenzylamine at a temperature between approximately 175 and approximately 200 degrees centigrade, and subsequently recovering the 3-beta-acetoxy-5,7,9(11)-pregnatrien-12,20-dione.

ROBERT H. LEVIN.
A VERN McINTOSH, Jr.
GEORGE B. SPERO.

References Cited in the file of this patent

UNITED STATES PATENTS

| Number | Name | Date |
|---|---|---|
| 2,447,325 | Gallagher | Aug. 17, 1948 |

FOREIGN PATENTS

| Number | Country | Date |
|---|---|---|
| 594,873 | Great Britain | Nov. 21, 1947 |